United States Patent [19]

Clews et al.

[11] 4,147,913
[45] Apr. 3, 1979

[54] WELD GAP SHEARS FOR A FLASH WELDING MACHINE

[75] Inventors: John C. Clews, Dudley; Austin G. Goodwin, Stourbridge, both of England

[73] Assignee: British Federal Welder & Machine Co. Limited, Dudley, England

[21] Appl. No.: 784,077

[22] Filed: Apr. 4, 1977

[30] Foreign Application Priority Data

Apr. 7, 1976 [GB] United Kingdom .............. 14028/76

[51] Int. Cl.² .......................................... B23K 11/04
[52] U.S. Cl. ...................................... 219/97; 219/101; 219/105

[58] Field of Search .................. 219/101, 82, 97, 105, 219/100

[56] References Cited

U.S. PATENT DOCUMENTS

| 3,808,393 | 4/1974 | Goodwin | 219/97 |
| 3,941,972 | 3/1976 | Toma | 219/97 |

Primary Examiner—E. A. Goldberg
Attorney, Agent, or Firm—Wellington M. Manning, Jr.; Luke J. Wilburn, Jr.

[57] ABSTRACT

A strip flash welder having a guillotine shear unit which is movable from a position out of the strip flow path into a position for shearing strip ends between the main clamping dies of the machine.

5 Claims, 3 Drawing Figures

WELD GAP SHEARS FOR A FLASH WELDING MACHINE

Prior Application

Priority, Great Britain Apr. 7, 1976 Application No. 14028/76.

This invention is concerned with a strip flash welding machine.

Strip flash welders are used to join together successive rolls of steel strip in continuous processes such as a pickle line. The welds have to be formed in a minimum time, because the process is continuous, but yet have to withstand extremely severe stresses imposed by subsequent cold rolling. Failure of a weld is extremely expensive causing the scrapping of the in-process strip section, the replacement of possibly damaged finishing rolls and the loss occasioned by the shutting down of a continuous process line.

Normal practice in a strip flash welder includes a preliminary shearing operation, to square the ends of the old and new strips and provide clean surfaces for the flash welding, the locating and accurate spacing of the strip ends in the welding machine and the welding operation itself. The locating and spacing operation is manually controlled while observing the strip ends against a gauge bar, and it is recognised that this manually controlled operation is the cause of many subsequent weld breaks, not least because of the difficulty of checking the parallelism of the end faces of the strip after delivery of the sheared ends to the welder from a shear unit located some distance upstream of the welder.

It is an object of the present invention to obviate the disadvantages outlined above by providing a strip flash welding machine which incorporates a guillotine shear at the welding die gap.

The present invention is a strip flash welding machine comprising means defining a strip flow path through the machine, a first pair of clamps extending transversely across the flow path to clamp the trailing end of a steel strip, a second pair of clamps extending transversely across the flow path to clamp the leading end of another steel strip, the second pair of clamps being movable along the strip flow path relative to the first pair of clamps, means for supplying welding current to the pairs of clamps, and a guillotine shear unit aligned with the gap between the first and second pairs of clamps for shearing strip ends secured by the clamps.

Preferably the shear unit comprises a C frame movable transversely into and out of the strip flow path, and support means engageable with the open ends of the C frame when the shear unit is in position for shearing.

An embodiment of the present invention will now be described, by way of example, with reference to the accompanying diagrammatic drawings, in which.

Figure 1:
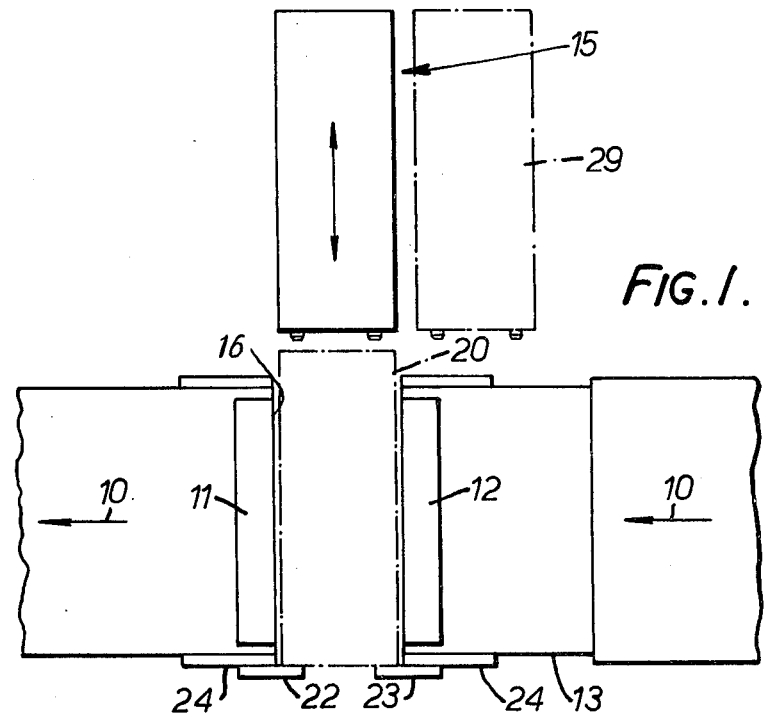
FIG. 1 is a plan view of a strip flash welder showing the relationship between the shear unit and the die gap of the welder.

Referring now to the drawing, a strip flash welding machine has a strip flow path 10 passing through it and, as normal, has a fixed pair of clamps or clamping dies 11 on the exit side of the welder and a pair of clamps or clamping dies 12 on the entry side of the welder which are mounted on a platen 13, the platen 13 being movable along the flow path 10. The clamps 11 and 12 are connected to an electrical supply of welding current, and the platen 13 is movable to allow for movement of the prepared leading end of a new strip clamped by the clamps 12 towards the prepared end of an old strip clamped by the clamps 11 to initiate flash and the subsequent upset movement.

The welding current is, of course, supplied to the strip ends through the clamps 11 and 12.

Conventional practice is to prepare the strip ends for welding by shearing in a shear unit upstream of the welder, and then to transfer the strip ends into the welding machine for positioning in the required end-to-end relationship and clamping for subsequent welding. The means conventionally employed for establishing this relationship is a spacing bar or gauging bar entered between the entry and exit side clamp heads, i.e. into the welder die gap, and up to which the strip ends are placed to set the required dimension from the ends of the strips to the faces of the respective clamps and to locate the sheared faces of the strip ends in the required spacing. The strip movements involved in this part of the strip joining operation include the reversal of the trailing strip end from its normal flow direction which is undesirable.

Furthermore and more importantly the setting up operations briefly described above are made difficult by the poor visual access available to the operator in the die gap of the welded when the gauge bar is entered therein, so that errors in the location of the strip ends are common. Additionally, the rquired relationship of two strip ends correctly spaced and clamped with the required initial strip end overhang into the welder die gap, and with both ends of the in-process and incoming strips in line and centred on the main strip flow line cannot always be achieved because of inaccurately sheared strip ends produced by the shear unit upstream of the welder. This condition is common, and can only be resolved by the completion of a weld in which the strip ends are correctly positioned for welding, but with the strips not in line or by welding with the strips in line but with incorrectly positioned strip ends. Both solutions produce welds which are liable to fail when subjected to high strip tensions.

The present invention seeks to avoid these problems by using a guillotine shear in the die gap to prepare the ends of the strips for welding. When the shearing operation is completed the spacing of the ends of the strips which are, of course, at this time clamped, is known accurately, i.e. the spacing is that of the blades of the shear unit, and the subsequent movements of the platen 13 can be controlled automatically to produce the desired weld of high quality. Manual control is only necessary when clamping the strip ends for shearing but here the latitude for error is much greater than in the conventional practice of clamping the strip ends for welding. Accurate strip end spacing and initial overhang is no longer under the control of the operator and is ensured in the present invention as the strip ends are clamped from before the shearing operation until the weld is complete.

Referring now to the drawing, the welder of the present invention is provided with a guillotine shear unit 15 aligned with the die gap 16 between the clamps 11 and 12. The shear unit 15 is movable transversely of the flow path 10 on slide bars 17 (FIG. 2) from the position illustrated in FIG. 1 in which it is out of the flow path 10, to a second position for shearing, the second position being indicated in FIG. 1 by the reference 20 and being almost the position shown in FIG. 2.

Figure 2:
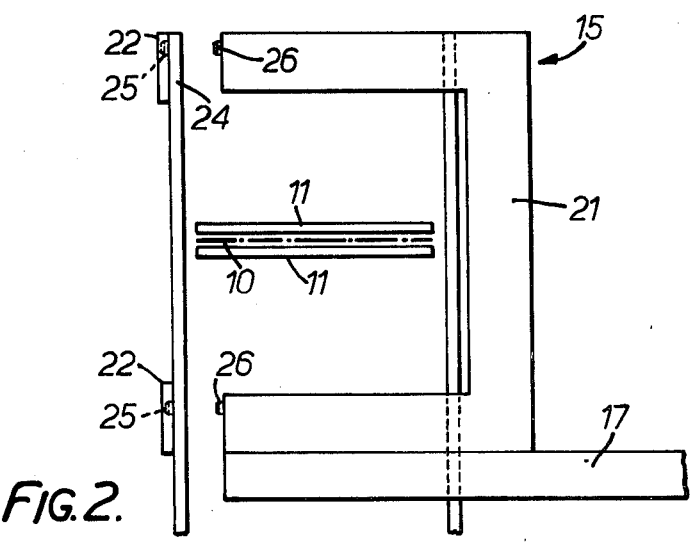
FIG. 2 is a side elevation of the shear unit in the die gap as seen from the upstream direction.

The shear unit 15 is basically a conventional guillotine shear having two pairs of shearing blades, one pair being for shearing the end of a respective one of the strips. The shearing blades, which are not illustrated for reasons of clarity, are mounted in a C frame 21, the arms of the C frame passing one above and one below the strip path 10 as shown in FIG. 2.

To enable the frame 21 to resist the forces imposed upon it during the shearing operation support means are provided to close the open end of the C frame when the unit 15 is in position for shearing. As illustrated, the support means in the present embodiment consists of extensions 22 and 23 on the main frame side plates 24 of the welder, the extensions having therein bushed holes 25 engageable with corresponding spigots 26 on the ends of the arms of the C frame.

The shear unit 15 is withdrawn from the position 20 to the transverse position shown in FIG. 1 to allow for the removal of the offcuts from the lower arm of the frame 21 while the strip line is running and also to protect the blades of the guillotine from spatter or spray of molten metal which occurs during the welding operation.

The embodiment described may be modified to provide further spatter protection by, for example, providing air blast protection, or a shield insertable between the blades and the die gap, or by moving the shear unit 15 out of the line of the die gap and thus away from the spray of molten metal.

Alternative support means may be provided for the open end of the C frame, such alternative means being for example a pillar swung or dropped into position and secured to the ends of the arms of the C frame.

Figure 3:
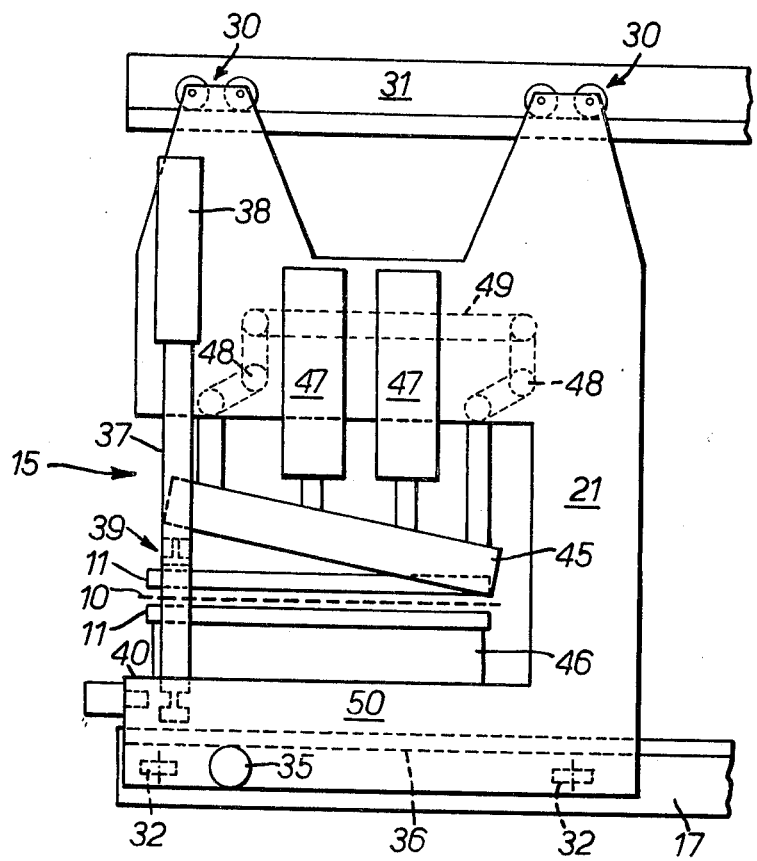
FIG. 3 is a side elevation of a modified embodiment of the shear unit in the die gap as seen from the upstream direction.

In FIG. 3 is illustrated a preferred embodiment of the shear unit, the same or corresponding parts carrying the same reference numerals as in FIG. 2. Again the shear unit is basically a C frame, but it is in this embodiment suspended from bogies 30 running on an overhead rail 31. The lower arm of the C frame is merely guided by rollers, indicated at 32, which engage vertical surfaces of the stationary frame associated with the shear unit.

The drive for the shear unit comprises a pair of motors 35 driving, via a common shaft, a pair of pinions which engage a rack 36 extending transversely across the flow path.

In the embodiment of FIG. 3, the support means for the open end of the C frame conprises two pillars 37 (only one of which is visible in FIG. 3) which are mounted on the upper arm of the C frame and are reciprocable by means of respective hydraulic rams 38 from a retracted position indicated by dotted lines 39 in FIG. 3 to an extended position in which they engage recesses in the lower arm of the C frame. The rams are locked in the extended position by respective ram operated bolts 40 which engage the pillars and secure them against movement.

In FIG. 3 the upper shear blades 45 are powered by two hydraulic rams 47, the sides of the upper blades being interlinked through bell crank levers 48 and a beam 49 to ensure that the upper blades maintain their correct angle relative to the lower blades 46.

A further feature of the embodiments of FIGS. 2 and 3 is the arrangement for removing the sheared strip ends. These ends cannot be allowed to remain in the region of the die gap as they adversely affect the magnetic conditions in that area and thus the performance of the transformers which supply the extremely large welding currents. In this embodiment, the strip ends fall into box member 50 on which the lower shear blades are mounted and are transported out of the region of the die gap as the shear unit is withdrawn. A stationary scraper blade, in the form of a pivoted flap allows the strip ends to pass out of the die gap but, when the shear unit next begins to return into the die gap the blade prevents re-entry of the strip ends. The strip ends fall off the end of the box member 50 onto an inclined chute and thence into a pit indicated at 29 in FIG. 1 from which they may be collected as and when convenient.

The operation of the embodiment of FIG. 3 is basically the same as that of FIG. 1, the pillars 37 in their retracted position allowing the shear unit to move between the first and second positions (see FIG. 1) and, in their extended position securely joining the ends of the arms of the C frame.

Both embodiments described allow for accurate shearing of the strip ends in the die gap and obviate or mitigate any problems of accurate location of the ends in the shear gap.

In the embodiment described all the rams have been hydraulic for convenience but clearly many of the less powerful rams, for example the rams 38, could be pneumatic.

We claim:

1. A strip flash welding machine comprising means defining a strip flow path through the machine, a first pair of clamps extending transversely across the flow path to clamp the trailing end of a steel strip, a second pair of clamps extending transversely across the flow path to clamp the leading end of another steel strip, the second pair of clamps being movable along the strip flow path relative to the first pair of clamps, means for supplying welding current to the pairs of clamps, and a guillotine shear unit aligned with the gap between the first and second pairs of clamps for shearing strip ends secured by the clamps, said shear unit comprising a C frame movable transversely into and out of the strip flow path, said frame having shear blades supported thereon, and support means engagable with ends of the C frame to interconnect same for shearing.

2. A strip flash welding machine as claimed in claim 1, in which the C frame is supported for said transverse movement from an overhead rail.

3. A strip flash welding machine as claimed in claim 1, in which said means engageable with the open ends of the C frame comprise at least one pillar mounted on the C frame and actuable to extend from a retracted position into a position bridging the open end of the C frame.

4. A strip flash welding machine as claimed in claim 3, including a bolt actuable to engage the pillar and secure it in the bridging position.

5. A strip flash welding machine as claimed in claim 1, including rack and pinion drive means for moving the shear unit into and out of the die gap.

* * * * *